Patented May 2, 1933

1,906,429

UNITED STATES PATENT OFFICE

LOU A. STEGEMEYER AND JOSEPH OTIS PEIRCE, OF CINCINNATI, OHIO, ASSIGNORS TO THE TWITCHELL PROCESS COMPANY, OF ST. BERNARD, OHIO, A CORPORATION OF OHIO

PROCESS OF HYDROLYZING CELLULOSE

No Drawing.  Application filed April 1, 1930. Serial No. 440,865.

This invention relates to a process of hydrolyzing cellulose materials.

Cellulose is the main constituent of wood, and most vegetable fibers, sticks, stems, and the like. Cellulose in various physical conditions is one of the largest and most important waste products of modern industry and agriculture.

The object of the invention is to provide a process of hydrolyzing cellulose to more water soluble forms such as fermentable sugars (glucose being a good example) and the various intermediate products.

We have discovered that cellulose hydrolyzes when heated or boiled with water in the presence of small quantities of mineral oil sulphonic acids or their salts. The use of the acids is considered preferable, as an acid solution is generally more conducive to hydrolysis.

The mineral oil sulphonates are used in small quantities, for instance, between 1 and 5 per cent of the weight of the cellulose. The mineral oil sulphonates are believed to be catalyzers. They have, however, other desirable physical actions, in that they increase the wetting power of the water with which the cellulose is boiled and also its tendency to penetrate into the cellulose.

The mineral oil sulphonates are derived from the process of producing medicinal white oils and the light colored technical oils by treating a mineral oil with fuming sulphuric acid and/or sulphur trioxide. As a result of this treatment two layers are formed, the upper layer known as the A layer or oil layer, and the lower layer known as the B layer or sludge layer. The sulphonates of the A layer are highly oil soluble and the sulphonates of the B layer are highly water soluble.

We prefer to use the sludge layer or highly water soluble sulphonates in this process.

The sugar solutions produced by this process of hydrolyzing cellulose can be readily fermented and the invention is regarded as pertinent to the art of producing industrial ethyl alcohol. The process may also be applied in the art of reducing farm waste to more nutritious conditions. For such use it is desirable to remove the sulphonates or sulphonic acids from the solution by treatment with lime or the like.

As an example of this invention, 25 pounds of saw-dust are mixed with 100 pounds of water and ½ pound of sludge layer mineral oil sulphonic acid. These bodies are then boiled together for fifteen minutes under a pressure of approximately 130 pounds, to the square inch. The resulting solution should contain between 4 and 5 pounds of fermentable sugars. The liquid can then be removed, and the treatment repeated as many times as is profitable. As a rule three treatments seem to produce the major portion of the fermentable sugars which the cellulose is capable of yielding.

Having described our invention, we desire to be limited only by the ensuing claims:

1. The process of hydrolyzing cellulose, which, comprises, boiling cellulose and water together in the presence of a small percentage of sludge layer mineral oil sulphonic acids.

2. The process of hydrolyzing cellulose, which, comprises, boiling cellulose and water together in the presence of a small percentage of the sludge layer mineral oil sulphonic acids recovered as a by-product from the refining of medicinal white oil and light colored technical oil with fuming sulphuric acid and/or sulphur trioxide.

In witness whereof, we hereunto subscribe our names.

LOU A. STEGEMEYER.
JOSEPH OTIS PEIRCE.